May 29, 1962

R. A. JEWELL 3,036,670

VEHICLE ROOF STRUCTURE

Filed March 10, 1959

INVENTOR
Robert A. Jewell

BY Mason, Fenwick & Lawrence
ATTORNEYS

May 29, 1962 R. A. JEWELL 3,036,670
VEHICLE ROOF STRUCTURE
Filed March 10, 1959 2 Sheets-Sheet 2

INVENTOR
Robert A. Jewell

BY Mason, Fenwick & Lawrence
ATTORNEYS

United States Patent Office 3,036,670
Patented May 29, 1962

3,036,670
VEHICLE ROOF STRUCTURE
Robert A. Jewell, Savannah, Ga., assignor to Great Dane Trailers, Inc., Savannah, Ga., a corporation of Georgia
Filed Mar. 10, 1959, Ser. No. 798,415
2 Claims. (Cl. 189—34)

This invention relates to body construction for vehicles, and particularly to structures specially adapted for, but not limited to, use as the roof or top of a trailer or truck body.

In a co-pending application, Jewell et al., Serial No. 709,337, now U.S. Patent No. 2,934,372, filed January 16, 1958, a vehicle body construction is disclosed which utilizes honeycomb panels as the flooring, side wall and roof covering. These are provided with peripheral flanges for attaching one panel to another and to the longérons and other frame members of the body. The attachment is usually made by riveting the flanges to one another, or to the frame members. It has been found in some instances that stresses set up by the vehicle side trusses put undue strain on the attaching rivets and the panels in the region of the rivets.

It is the object of the present invention to provide roof, or top, structure for vehicles which will incorporate honeycomb panels connected in such manner that the roof can flex along its length and there can be relative movement between the panels.

It is another object of the invention to provide a vehicle roof structure which can be completely assembled yet compactly arranged for shipment when in assembled form to expedite attachment to the vehicle frame when received, or to permit the roof to be completed as a sub-assembly operation in the manufacture of truck or trailer bodies.

A further object is the provision of roof structure which will contain translucent areas to transmit light to illuminate the interior of the truck or trailer.

Another object is to provide an improved panel construction wherein two or more panels are formed as a unit with flexible means between the panels of the unit to permit relative flexing when in use.

Other objects of the invention will become apparent from the following description of practical embodiments thereof, when taken in conjunction with the drawings which accompany, and form part of, this specification.

Figure 1:
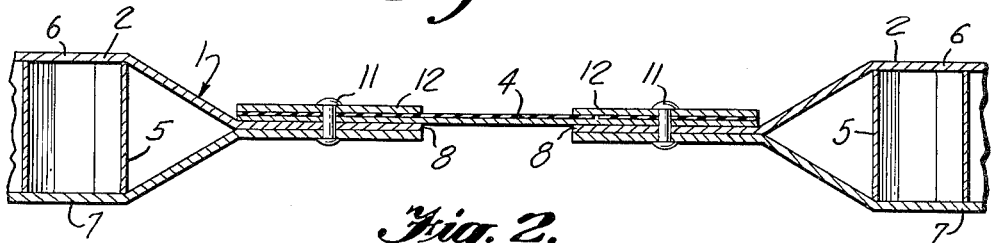
FIGURE 1 is a transverse section through the adjacent ends of two honeycomb panels constructed as disclosed in the abovementioned prior application, and connected in accordance with the principles of the present invention.
Figure 2:
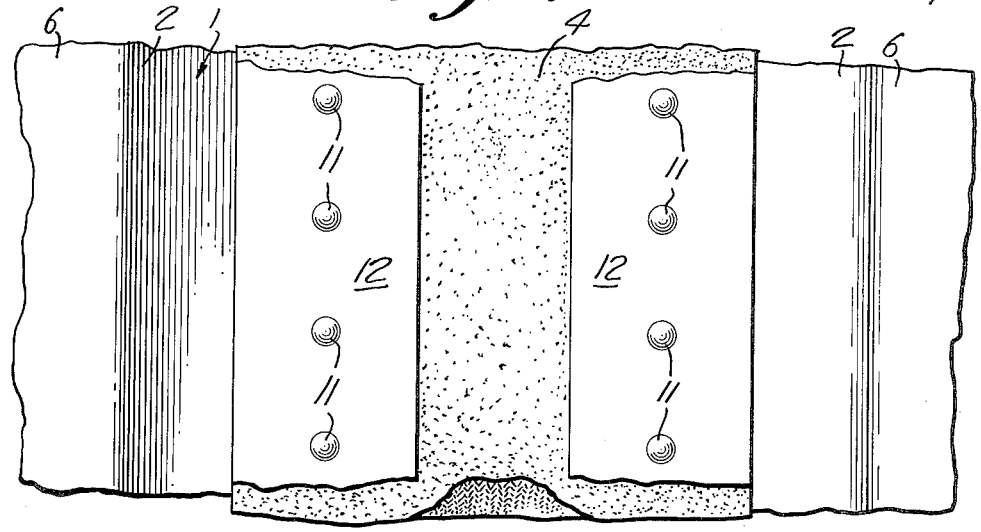
FIGURE 2 is a fragmentary plan view of the structure shown in FIGURE 1.

In general, the invention contemplates a vehicle roof, or similar structure, composed of a plurality of rigid panels extending transversely of the vehicle and spaced apart along the vehicle, with adjacent edges of adjacent panels being connected by means of a flexible connector to permit relative movement between the several panels under the stresses set up by loading and movement of the vehicle. The invention further envisions the flexible connectors being translucent, or transparent, to admit light to the vehicle body interior, and several panels with their flexible interconnections being formed as units.

Referring to the drawings in detail, and first adverting to that form of the invention shown in FIGURES 1 to 4, inclusive, there is shown a roof structure 1 composed of a plurality of rigid panels 2 which extend across the vehicle and have their ends attached to the top rails, or longérons, 3 of the vehicle. The panels are spaced apart longitudinally of the vehicle and adjacent edges of adjacent panels are connected along their full lengths by flexible connector strips 4, which are also secured to the top rails of the vehicle.

The panels 2 are of the type disclosed in co-pending application Serial No. 709,337, now U.S. Patent No. 2,934,372, and include a paper, or other material, honeycomb core 5 covered by top and bottom skins, or sheets, 6 and 7 of aluminum. The sheets are adhered to the core and extend peripherally beyond the core edges so that they may be brought together, as bridles, to form side and end flanges 8 and 9. The flanges 8 and 9 lie in the medial depthwise plane of the panel.

The end flanges 9 are riveted, or bolted, as at 10, to the vehicle rails, and the side flanges 8 are riveted, or otherwise secured, as at 11, to the sides of the connector strips 4. Reinforcing metal strips 12 may be used to overlie the flexible strips along the line of connection to the side flanges of the panels, to prevent tearing out of the connector strips at the rivets.

The connector strips may be formed of any suitable flexible material, such as rubber-coated canvas or the like, which will have required strength. The spacing between adjacent panels is quite small so that little or no load is carried by the connector strips. They serve principally as bridge members to close the gap between adjacent panels. If desired, a thin transparent, or translucent, material such as "Mylar" film may be used to permit light to pass through to the interior of the vehicle body.

Figure 3:
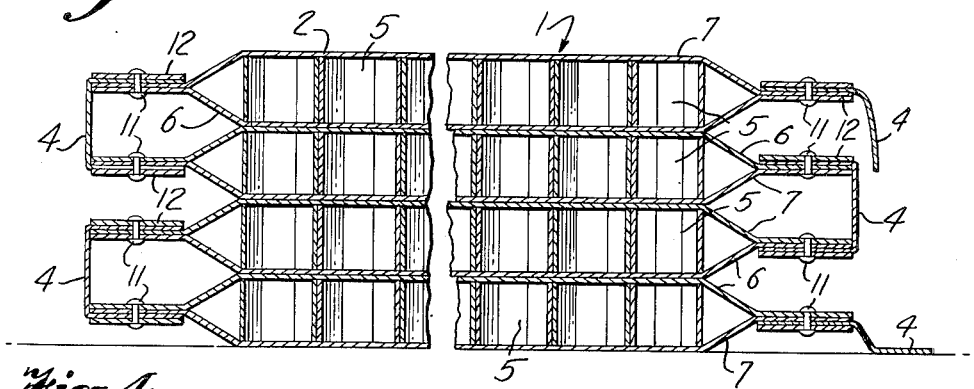
FIGURE 3 is a section taken transversely of the panels of a roof constructed in accordance with the present invention, with the roof arranged for shipment.
Figure 4:
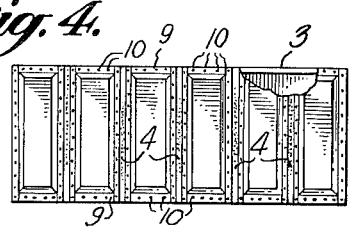
FIGURE 4 is a top plan view of a trailer, illustrating a complete roof structure.

By having the spacing between adjacent panels at least equal to the thickness of the panel, the entire roof structure can be assembled and fan-folded, as shown in FIGURE 3, for shipment or handling. This makes it possible to pre-assemble an entire roof structure, carry it to the vehicle body, and unfold it on the vehicle top rails and secure it in place. By this procedure, a new roof can be supplied for an old vehicle without bringing the vehicle to the source of manufacture.

Figure 5:
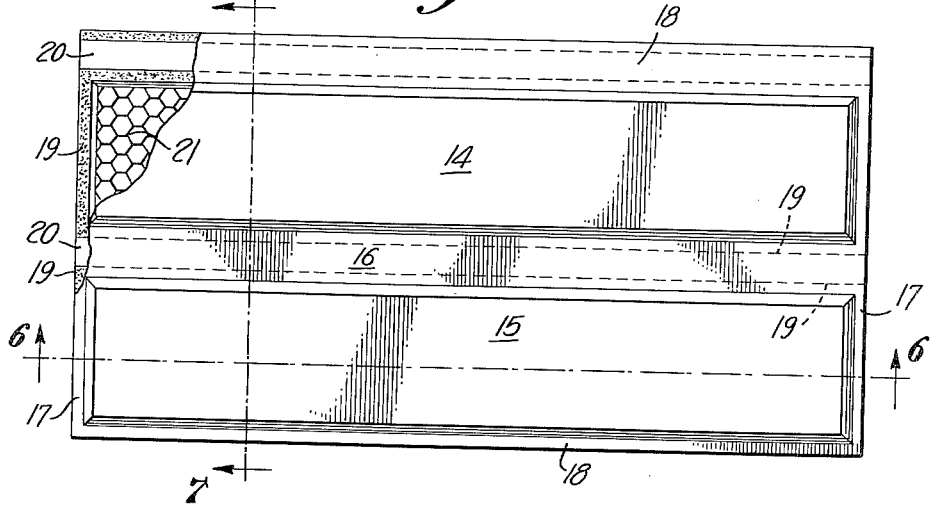
FIGURE 5 is a plan view of an improved honeycomb unit comprising more than one panel.
Figure 6:
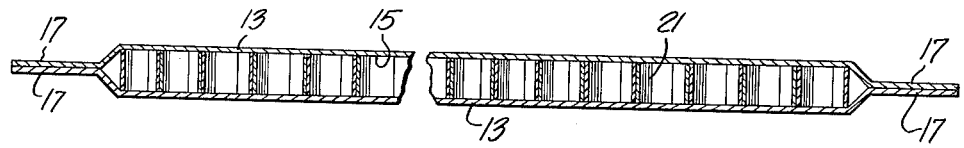
FIGURE 6 is a longitudinal section through the unit shown in FIGURE 5, and is taken on the line 6—6 of FIGURE 5.
Figure 7:
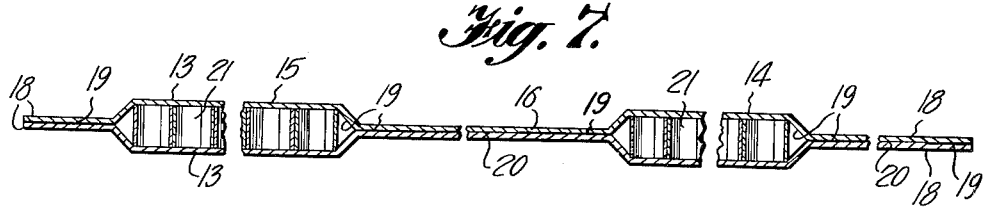
FIGURE 7 is a transverse section taken on the line 7—7 of FIGURE 5.

In FIGURES 5 to 7, inclusive, a modified panel unit is shown. Here, sheets 13 of aluminum sufficiently large to form two panels are stamped to provide a pair of recessed pans 14 and 15, separated by a connecting strip 16. Flanges 17 and 18 project from the ends and free sides of the pans. It will be noted that the flange 18 on one free edge is considerably wider than the other. Adhesive is then applied to the entire pan area and to a narrow band along each side of the pan, so that broad adhesive areas 19 are formed extending from end to end of the sheets. The intervening areas 20 have no adhesive.

When the pans are formed and adhesive applied, a honeycomb core 21 is placed in each pan of one stamped sheet and another sheet is inverted over the first to seat upon the cores. The pan depth is such that the connecting strips 16 of the two sheets as well as the end and side flanges 17 and 18 will be in surface contact while the core face will contact the bottoms of the pans of the two sheets. Thus, the cores will be adhered to the pans and the flanges of the two sheets will be adhered peripherally around the pans. The separating strips, however, will not be adhered over most of their widths as no adhesive was applied to these surfaces. By this construction, two panels will be formed having upper and lower skins with intermediate cores, and the skins adhered to the cores and to one another around the peripheries of the cores. This will provide rigid panel structures. The skins in the area of the connecting strip, however, are not adhered and as they are thin sheet metal may flex freely. Thus, a unit of two rigid panels with a flexible intermediate connector is formed.

The units are secured by their end flanges to the vehicle top rails and adjacent units are joined by riveting. The narrow free edge of one unit will be joined to the wide free edge of the next. As the aluminum sheets of the wider free edges are not adhered to one another, each rigid panel will have a flexible connection to the next along the full length of the vehicle top.

With both of the disclosed forms of the invention, the rigid panel structures are attached to one another by flexible connectors so that relative movement can be had between adjacent panel structures. This relieves the connecting rivets of the stresses due to side truss deflection and prevents rupture of the joints between adjacent panels.

While in the above practical embodiments of the invention have been disclosed, it will be understood that the precise details of structure shown and described are merely by way of illustration, and the invention may take other forms within the scope of the appended claims.

What is claimed is:

1. A structural unit for vehicle bodies comprising, a pair of cover sheets of thin flexible sheet metal each having at least two rectangular recesses therein with the recesses of each sheet being spaced apart to provide a connector strip between the recesses, the recesses of the two sheets being oppositely disposed relative to the planes of the sheets and the recesses of one sheet overlying the recesses of the other to form enclosures, honeycomb cores filling the enclosures, said sheets being adhered to the cores over the entire extent of the enclosures and to each other peripherally of the enclosures, and the cover sheets being unattached to one another along the connector strip intermediate the areas of peripheral adherence of the enclosures.

2. A structural unit for vehicle bodies as claimed in claim 1 wherein, the cover sheets project along one edge beyond the area of peripheral adherence to provide a connector strip for attachment of the unit to a similar unit.

References Cited in the file of this patent

UNITED STATES PATENTS

| | | |
|---|---|---|
| 1,306,609 | Moore | June 10, 1919 |
| 1,703,395 | House | Feb. 26, 1929 |
| 2,001,632 | Schlichting | May 14, 1935 |
| 2,056,563 | Budd | Oct. 6, 1936 |
| 2,069,413 | Leadbetter | Feb. 2, 1937 |
| 2,108,795 | Budd | Feb. 22, 1938 |
| 2,113,128 | Cunnington | Apr. 5, 1938 |
| 2,147,059 | Randall | Feb. 14, 1939 |
| 2,720,948 | Pajak | Oct. 18, 1955 |
| 2,744,042 | Pace | May 1, 1956 |
| 2,921,814 | Mede | Jan. 19, 1960 |

FOREIGN PATENTS

| | | |
|---|---|---|
| 639,479 | Germany | Dec. 5, 1936 |
| 334,113 | Great Britain | Aug. 28, 1930 |